(12) United States Patent
Mongia et al.

(10) Patent No.: US 11,360,566 B2
(45) Date of Patent: Jun. 14, 2022

(54) MECHANISM TO PROVIDE VISUAL FEEDBACK REGARDING COMPUTING SYSTEM COMMAND GESTURES

(71) Applicant: Intel Corporation, Santa Clara, CA (US)

(72) Inventors: Rajiv Mongia, Redwood City, CA (US); Achintya Bhowmik, Milpitas, CA (US); Mark Yahiro, Santa Clara, CA (US); Dana Krieger, Emeryville, CA (US); Ed Mangum, San Mateo, CA (US); Diana Povieng, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/506,583

(22) Filed: Jul. 9, 2019

(65) Prior Publication Data

US 2020/0174574 A1 Jun. 4, 2020

Related U.S. Application Data

(63) Continuation of application No. 13/997,640, filed as application No. PCT/US2011/067289 on Dec. 23, 2011, now Pat. No. 10,345,911.

(51) Int. Cl.
*G06F 3/0481* (2022.01)
*G06F 3/01* (2006.01)
(Continued)

(52) U.S. Cl.
CPC .............. *G06F 3/017* (2013.01); *G06F 3/011* (2013.01); *G06F 3/0481* (2013.01);
(Continued)

(58) Field of Classification Search
CPC ...... G06F 3/017; G06F 3/04895; G06F 3/011; G06F 2203/04806; G06F 3/04812; G06F 3/0487; G06F 3/0481
See application file for complete search history.

(56) References Cited

U.S. PATENT DOCUMENTS 5,581,670 A 12/1996 Bier et al.
5,594,469 A 1/1997 Freeman et al.
(Continued)

FOREIGN PATENT DOCUMENTS

CA 2768893 2/2011
TW 393629 6/2000
(Continued)

OTHER PUBLICATIONS

International Bureau, "International Preliminary Report on Patentability," mailed in connection with International Patent Application No. PCT/US2011/067289, dated Jul. 3, 2014, 7 pages.

(Continued)

*Primary Examiner* — Anil K Bhargava
(74) *Attorney, Agent, or Firm* — Hanley, Flight & Zimmerman, LLC

(57) ABSTRACT

A mechanism to provide visual feedback regarding computing system command gestures. An embodiment of an apparatus includes a sensing element to sense a presence or movement of a user of the apparatus, a processor, wherein operation of the processor includes interpretation of command gestures of a user to provide input to the apparatus; and a display screen, the apparatus to display one or more icons on the display screen, the one or more icons being related to the operation of the apparatus. The apparatus is to display visual feedback for a user of the apparatus, visual (Continued)

feedback including a representation of one or both hands of the user while the one or both hands are within a sensing area for the sensing element.

32 Claims, 9 Drawing Sheets

(51) Int. Cl.
  *G06F 3/04895* (2022.01)
  *G06F 3/04812* (2022.01)
  *G06F 3/0487* (2013.01)
(52) U.S. Cl.
  CPC ........ *G06F 3/0487* (2013.01); *G06F 3/04812* (2013.01); *G06F 3/04895* (2013.01); *G06F 2203/04806* (2013.01)

(56) References Cited

U.S. PATENT DOCUMENTS

| | | | |
|---|---|---|---|
| 6,222,465 | B1 | 4/2001 | Kumar et al. |
| 7,030,861 | B1 | 4/2006 | Westerman et al. |
| 7,274,803 | B1* | 9/2007 | Sharma ............... G06K 9/00375 |
| | | | 348/14.15 |
| 7,519,223 | B2 | 4/2009 | Dehlin et al. |
| 7,598,942 | B2 | 10/2009 | Underkoffler et al. |
| 7,849,421 | B2 | 12/2010 | Yoo et al. |
| 7,924,271 | B2 | 4/2011 | Christie et al. |
| 8,181,123 | B2 | 5/2012 | Stone-Perez et al. |
| 8,333,661 | B2 | 12/2012 | Ng |
| 8,334,842 | B2 | 12/2012 | Markovic et al. |
| 8,448,083 | B1 | 5/2013 | Migos et al. |
| 8,693,724 | B2 | 4/2014 | Ahmed et al. |
| 8,830,227 | B2 | 9/2014 | Rais et al. |
| 8,982,182 | B2 | 3/2015 | Shpunt et al. |
| 9,002,099 | B2 | 4/2015 | Litvak et al. |
| 9,069,386 | B2 | 6/2015 | Ajika |
| 9,098,931 | B2 | 8/2015 | Shpunt et al. |
| 9,171,200 | B2 | 10/2015 | Subramanian et al. |
| 9,189,073 | B2 | 11/2015 | Mongia et al. |
| 9,189,825 | B2 | 11/2015 | Im et al. |
| 9,678,574 | B2 | 6/2017 | Mongia et al. |
| 9,684,379 | B2 | 6/2017 | Mongia et al. |
| 10,345,911 | B2 | 7/2019 | Mongia et al. |
| 2002/0064382 | A1 | 5/2002 | Hildreth et al. |
| 2003/0036732 | A1 | 2/2003 | Marano-Ford |
| 2003/0076293 | A1 | 4/2003 | Mattsson |
| 2005/0003851 | A1 | 1/2005 | Chrysochoos et al. |
| 2005/0052427 | A1 | 3/2005 | Wu et al. |
| 2005/0269950 | A1 | 12/2005 | Giraldo et al. |
| 2006/0026521 | A1 | 2/2006 | Hotelling et al. |
| 2006/0031786 | A1 | 2/2006 | Hillis et al. |
| 2006/0036944 | A1 | 2/2006 | Wilson |
| 2006/0132432 | A1 | 6/2006 | Bell |
| 2006/0187196 | A1 | 8/2006 | Underkoffler et al. |
| 2006/0209021 | A1 | 9/2006 | Yoo et al. |
| 2007/0230929 | A1 | 10/2007 | Niwa et al. |
| 2008/0005703 | A1 | 1/2008 | Radivojevic et al. |
| 2008/0036732 | A1 | 2/2008 | Wilson et al. |
| 2008/0052643 | A1 | 2/2008 | Ike et al. |
| 2008/0120577 | A1 | 5/2008 | Ma et al. |
| 2008/0163131 | A1 | 7/2008 | Hirai et al. |
| 2008/0231926 | A1* | 9/2008 | Klug ................... H04N 13/327 |
| | | | 359/23 |
| 2009/0217211 | A1 | 8/2009 | Hildreth et al. |
| 2010/0031202 | A1 | 2/2010 | Morris et al. |
| 2010/0031203 | A1 | 2/2010 | Morris et al. |
| 2010/0045705 | A1 | 2/2010 | Vertegaal et al. |
| 2010/0060722 | A1 | 3/2010 | Bell |
| 2010/0199232 | A1 | 8/2010 | Mistry et al. |
| 2010/0280988 | A1 | 11/2010 | Underkoffler et al. |
| 2010/0281436 | A1 | 11/2010 | Kipman et al. |
| 2010/0281437 | A1 | 11/2010 | Stone-Perez et al. |
| 2010/0303289 | A1 | 12/2010 | Polzin et al. |
| 2011/0102570 | A1 | 5/2011 | Wilf et al. |
| 2011/0115702 | A1 | 5/2011 | Seaberg |
| 2011/0119640 | A1 | 5/2011 | Berkes et al. |
| 2011/0197263 | A1 | 8/2011 | Stinson, III |
| 2011/0219340 | A1 | 9/2011 | Pathangay et al. |
| 2011/0221666 | A1* | 9/2011 | Newton ............... G06F 3/04883 |
| | | | 345/156 |
| 2011/0221669 | A1 | 9/2011 | Shams et al. |
| 2011/0258537 | A1 | 10/2011 | Rives et al. |
| 2011/0283212 | A1 | 11/2011 | Warner |
| 2011/0289455 | A1 | 11/2011 | Reville et al. |
| 2011/0296353 | A1 | 12/2011 | Ahmed et al. |
| 2011/0298708 | A1* | 12/2011 | Hsu ....................... G06F 3/0425 |
| | | | 345/158 |
| 2012/0051588 | A1 | 3/2012 | McEldowney |
| 2012/0084688 | A1 | 4/2012 | Robert et al. |
| 2012/0119988 | A1 | 5/2012 | Izumi |
| 2012/0169646 | A1 | 7/2012 | Berkes et al. |
| 2012/0169670 | A1 | 7/2012 | Kim et al. |
| 2012/0235903 | A1 | 9/2012 | Im |
| 2012/0249741 | A1 | 10/2012 | Maciocci et al. |
| 2012/0327125 | A1* | 12/2012 | Kutliroff .................. G06F 3/011 |
| | | | 345/660 |
| 2013/0106898 | A1 | 5/2013 | Saint-Loubert-Bié et al. |
| 2013/0154919 | A1 | 6/2013 | Tan et al. |
| 2014/0013279 | A1 | 1/2014 | Mongia et al. |
| 2016/0179209 | A1 | 6/2016 | Anderson |

FOREIGN PATENT DOCUMENTS

| | | |
|---|---|---|
| TW | M294069 | 7/2006 |
| TW | 201037577 | 10/2010 |
| TW | 201120681 | 6/2011 |
| TW | 201128541 | 8/2011 |
| TW | 201137766 | 11/2011 |
| WO | 20110066343 | 6/2011 |
| WO | 2013095671 | 6/2013 |
| WO | 2013095677 | 6/2013 |
| WO | 2013095678 | 6/2013 |
| WO | 2013095679 | 6/2013 |

OTHER PUBLICATIONS

United States Patent and Trademark Office, "Notice of Allowance," mailed in connection with U.S. Appl. No. 13/997,634, dated Aug. 16, 2016, 7 pages.

United States Patent and Trademark Office, "Notice of Allowance," mailed in connection with U.S. Appl. No. 13/997,634, dated Mar. 1, 2017, 7 pages.

Taiwan Intellectual Property Office, "English Translation of Search Report," mailed in connection with Taiwanese Patent Application No. 101147201, dated Jun. 21, 2016, 1 page.

Taiwan Intellectual Property Office, "Office Action," mailed in connection with Taiwanese Patent Application No. 101147201, dated Jun. 16, 2015, 8 pages (includes English translation).

European Patent Office, "Extended European Search Report," mailed in connection with European Patent Application No. 11878127.7, dated Jul. 22, 2015, 6 pages.

United States Patent and Trademark Office, "Notice of Allowance," mailed in connection with U.S. Appl. No. 13/997,978, dated Mar. 30, 2015, 7 pages.

Taiwan Intellectual Property Office, "Office Action," mailed in connection with Taiwanese Patent Application No. 101147201, dated Feb. 24, 2015, 15 pages (includes English translation).

United States Patent and Trademark Office, "Non-final Office Action," mailed in connection with U.S. Appl. No. 13/997,639, dated Jun. 12, 2015, 14 pages.

United States Patent and Trademark Office, "Non-final Office Action," mailed in connection with U.S. Appl. No. 13/997,634, dated Jun. 18, 2015, 12 pages.

Taiwan Intellectual Property Office, "Official Letter," mailed in connection with Taiwanese Patent Application No. 101145913, dated Mar. 2, 2015, 16 pages (includes English translation).

International Searching Authority, "International Search Report and Written Opinion," mailed in connection with International Patent Application No. PCT/US2011/067280, dated Aug. 28, 2012, 10 pages.

(56) References Cited

OTHER PUBLICATIONS

International Searching Authority, "International Search Report and Written Opinion," mailed in connection with International Patent Application No. PCT/US2011/067287, dated Aug. 28, 2012, 10 pages.
International Searching Authority, "International Search Report and Written Opinion," mailed in connection with International Patent Application No. PCT/US2011/067289, dated Aug. 28, 2012, 10 pages.
International Searching Authority, "International Search Report and Written Opinion," mailed in connection with International Patent Application No. PCT/US2011/067290, dated Aug. 28, 2012, 10 pages.
Taiwan Intellectual Property Office, "Office Action," mailed in connection with Taiwanese Patent Application No. 101146399, dated Sep. 23, 2014, 19 pages (includes English translation).
United States Patent and Trademark Office, "Non-final Office Action," mailed in connection with U.S. Appl. No. 13/997,978, dated Dec. 5, 2014, 6 pages.
Taiwan Intellectual Property Office, "Official Letter," mailed in connection with Taiwanese Patent Application No. 101149340, dated Jul. 28, 2014, 13 pages (includes English translation).
United States Patent and Trademark Office, "Final Office Action," mailed in connection with U.S. Appl. No. 13/997,640, dated Mar. 30, 2018, 13 pages.
United States Patent and Trademark Office, "Notice of Allowance," mailed in connection with U.S. Appl. No. 13/997,640, dated Feb. 27, 2019, 13 pages.
United States Patent and Trademark Office, "Non-final Office Action," mailed in connection with U.S. Appl. No. 13/997,640, dated Sep. 7, 2017, 5 pages.
United States Patent and Trademark Office, "Final Office Action," mailed in connection with U.S. Appl. No. 13/997,640, dated Aug. 10, 2016, 13 pages.
United States Patent and Trademark Office, "Non-final Office Action," mailed in connection with U.S. Appl. No. 13/997,640, dated Apr. 22, 2016, 14 pages.
United States Patent and Trademark Office, "Final Office Action," mailed in connection with U.S. Appl. No. 13/997,640, dated Jul. 21, 2015, 19 pages.
United States Patent and Trademark Office, "Non-final Office Action," mailed in connection with U.S. Appl. No. 13/997,640, dated Mar. 27, 2015, 17 pages.
United States Patent and Trademark Office, "Non-final Office Action," mailed in connection with U.S. Appl. No. 13/997,639, dated Dec. 24, 2015, 10 pages.
United States Patent and Trademark Office, "Final Office Action," mailed in connection with U.S. Appl. No. 13/997,639, dated May 16, 2016, 12 pages.
United States Patent and Trademark Office, "Notice of Allowance," mailed in connection with U.S. Appl. No. 13/997,639, dated Nov. 8, 2016, 12 pages.
United States Patent and Trademark Office, "Notice of Allowance," mailed in connection with U.S. Appl. No. 13/997,639, dated Feb. 16, 2017, 8 pages.
United States Patent and Trademark Office, "Final Office Action" mailed in connection with U.S. Appl. No. 13/997,634, dated Jan. 4, 2016, 13 pages.
United States Patent and Trademark Office, "Non-final Office Action" mailed in connection with U.S. Appl. No. 13/997,634, dated Apr. 19, 2016, 13 pages.
Taiwan Intellectual Property Office, "Official Letter" mailed in connection with Taiwanese Patent Application No. 105122067, dated Jan. 8, 2018, 6 pages.
Taiwan Intellectual Property Office, "Official Letter" mailed in connection with Taiwanese Patent Application No. 105122067, dated Jul. 20, 2018, 10 pages.
Taiwan Intellectual Property Office, "Official Letter," mailed in connection with Taiwanese Patent Application No. 101145913, dated Jan. 8, 2018, 7 pages.

* cited by examiner

MECHANISM TO PROVIDE VISUAL FEEDBACK REGARDING COMPUTING SYSTEM COMMAND GESTURES

CROSS-REFERENCE TO RELATED APPLICATIONS

This patent arises from a continuation of U.S. patent application Ser. No. 13/997,640 (now U.S. Pat. No. 10,345, 911), filed Jun. 24, 2013, entitled "MECHANISM TO PROVIDE VISUAL FEEDBACK REGARDING COMPUTING SYSTEM COMMAND GESTURES," which is a national stage entry of International Patent Application Serial No. PCT/US2011/067289, filed Dec. 23, 2011, entitled "MECHANISM TO PROVIDE VISUAL FEEDBACK REGARDING COMPUTING SYSTEM COMMAND GESTURES." The contents of these applications are hereby incorporated herein by reference in their entireties.

TECHNICAL FIELD

Embodiments of the invention generally relate to the field of computing systems and, more particularly, to a mechanism to provide visual feedback regarding computing system command gestures.

BACKGROUND

Computing systems and related systems are being developed to provide a more natural interface for users. In particular, computing systems may include sensing of a user of the computing system, where user sensing may include gesture recognition, where the system attempts to recognize one or more command gestures of a user, and in particular hand gestures of the user.

For example, the user may perform several gestures to manipulate symbols and other images shown on a display screen of the computer system.

However, a user is generally required to perform command gestures without being aware how the gestures are being interpreted by the computing system. For this reason the user may not be aware that a gesture will not be interpreted in the manner intended by the user.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
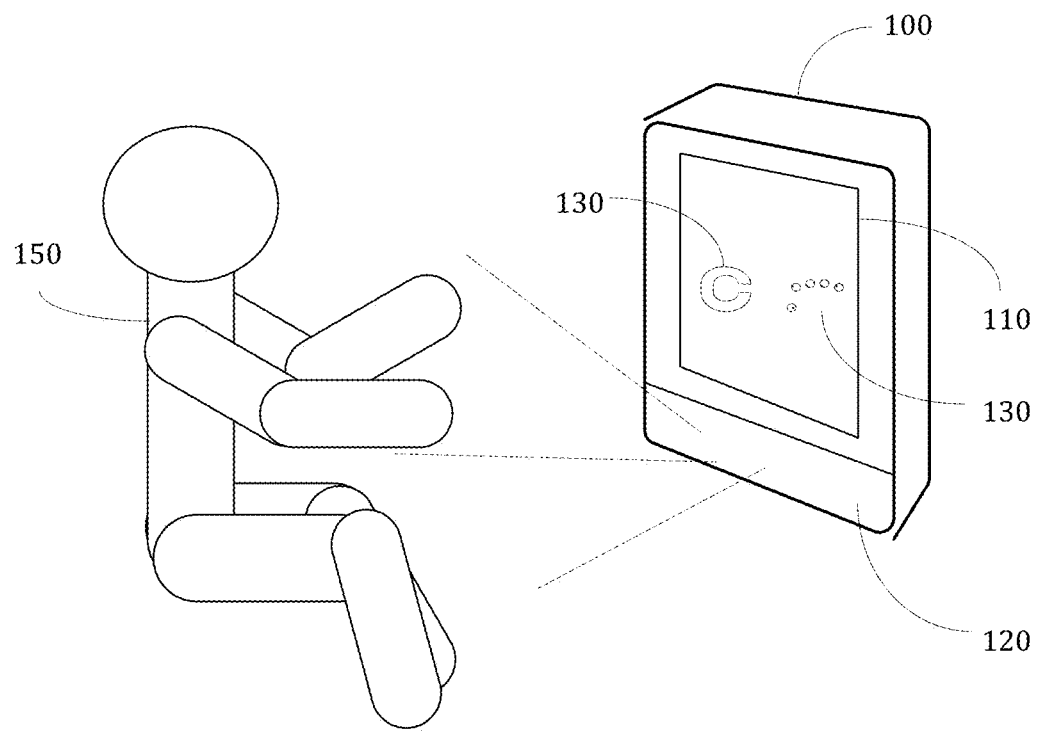
FIG. 1 illustrates an embodiment of a computing system including a mechanism to provide visual feedback to users regarding presentation of command gestures.

Embodiments of the invention are generally directed to a mechanism to provide visual feedback regarding computing system command gestures.

As used herein:

"User sensing" means a computer operation to sense a user. The sensing of a user may include position and motion detection, such as a computing system detecting and interpreting gestures made by a user of the computing system as inputs to the computing system. User sensing may utilize any technology by which the user may be sensed by the computing, including visual sensing (using one or more cameras or similar devices), audio sensing (including detection of sounds and detection of sound reflection), heat or infrared sensing, sensing and interpretation of projected light patterns (visible or invisible), and other technologies. User sensing may include operations of a perceptual computing system in sensing user operations and intent, where a perceptual computing system is a system allowing for the addition of alternative input modalities, including gesture recognition.

"Computing system" means any device or system that includes computing capability. A computing system includes both a single unit and a system of multiple elements. A computing system is not limited to a general-purpose computer, but also includes special purpose devices that include computing capability. A "computing system" includes a desktop computer, a game console, a laptop or notebook computer, an all-in-one (MO) computer, a tablet computer, a handheld computing device including a smart phone, or other apparatus or system having computing and display capability.

In some embodiments, an intent of the user to interact with a computing system is determined by the motion of the user, such as by a user's hand or hands, toward an element of the computing system. While embodiments are not limited to a user's hands, this may be the most common operation by the user.

In a computing system utilizing user sensing to detect system inputs, gestures made by a user to communicate with the computing system (which may be referred to generally as command gestures) may be difficult for the user to gauge as such gestures are being made. Thus, a user may be able to discern from results that a particular gesture was or was not effective to provide a desired result, but may not understand why the gesture was effective or ineffective.

In some cases, the reason that a gesture is ineffective is that the user isn't accurate in performing the gesture, such as circumstances in which the user isn't actually presenting the gesture the user believes the user is presenting, or the user is making the gesture in a manner that creates difficulty in the computing system sensing the user's gesture, such as in an orientation that is more difficult for the computing system to detect. Thus, a user may be forced to either watch the user's own hand while performing the gesture, or perform the gesture in an exaggerated manner to ensure that the computing system registers the intended gesture. In either case, the user is prevented from interfacing naturally with the computing system.

In some embodiments, a computing system includes a mechanism to provide feedback regarding computing system command gestures. In some embodiments, a computing system includes an on screen visual feedback mechanism that can be used to provide feedback to a user of a perceptual computing (PerComp) system while a command gesture is being performs. In some embodiments, a natural feedback mechanism is provided for an end user so that the user is able to properly use the system tools.

In some embodiments, a mechanism presents certain visual representations of a user's hand or hands on a display screen to allow the user to understand a relationship between the user's hands and symbols on the display screen, In some embodiments, a first framework provides visual feedback including bright lights at the points at which the fingers are located (finger-tip-lights) in a visual representation of a position of a user's hand. In some embodiments, the movement of a user's fingers in space are represented by light that trails the finger-tip-lights' locations on the display screen for a certain period of time. In some embodiments, the visual feedback presents an image that is analogous to an image of a finger moving in a pool of water, where a trail is visible following the movement of the finger, but such trail dissipates are a short period of time. In some embodiments, the finger-tip-lights and the image of trailing lights provides feedback to the end user with respect to position and motion of the user's hand, and further creates the illusion of a full hand without resorting to using a full hand skeleton in visual feedback. In some embodiments, entry into the computing system may happen gradually with the finger-tip-lights becoming brighter as the user enters into the proper zone for sensing of command gestures. In some embodiments, entry into the computing system may happen gradually with the finger-tip-lights becoming more focused as the user enters into the proper zone for sensing of command gestures. In some embodiments, the finger-tip-light color or shape may change when the user is conducting or has completed a command gesture.

In some embodiments, a different in brightness provides feedback to a user regarding the orientation of the hand of the user in relation to the display screen. In some embodiments, the finger-tip-light are brighter when the fingers are pointed towards the display screen and dimmer when the fingers of the hand of a user are pointed away from the display screen versus. In some embodiments, the brightness of a displayed image may have a different orientation, such as a reverse orientation where the finger-tip-light are brighter when the fingers are pointed away the display screen and dimmer when the fingers of the hand of a user are pointed towards the display screen. In some embodiments, the feedback regarding the brightness of the fingers of the user may motivate the user to orient the hand of the user towards display screen and sensor such that the fingers of the user are not obscured in sensing.

In some embodiments, a second framework provides feedback for a command gesture to select a element of a display screen, where he gesture involves forming the hand in a shape in which the fingers can pinch or squeeze to select a targeted icon or other symbol (which may be referred to herein as a "claw" gesture). In some embodiments, a computer system may provide feedback for a claw select function by displaying a "C" shape with a partial fill. In some embodiments, user to complete the circle by closing the hand to select the object. If the open claw stays over a particular location for a long period of time, the screen responds by showing what the user can do in order to select the object.

In some embodiments, upon selecting an object, a light spins, thus encouraging the user to "rotate" the object to preview, or to move the object toward a projector light in order to view the file. In some embodiments, a "Search" looking glass gesture feedback is a magnifying glass on the screen as shown.

In some embodiments, a "zoom" function may be utilized, where, for example, two finger-tip-lights provide feedback regarding a zoom out gesture formed by a hand of the user.

In some embodiments, a third framework includes a "magnifying glass" or loop icon to provide visual feedback for a loop gesture performed by a user by touching the tip of the thumb with the tip of at least one other finger of the same hand. In some embodiments, the computing system provides information regarding what is represented by the icon when the loop representation surrounds the icon at least in part.

In some embodiments, an apparatus includes a sensing element to sense a presence or movement of a user of the apparatus, a processor, wherein operation of the processor includes interpretation of command gestures of a user to provide input to the apparatus; and a display screen, the apparatus to display one or more icons on the display screen, the one or more icons being related to the operation of the apparatus. The apparatus is to display visual feedback for a user of the apparatus, visual feedback including a representation of one or both hands of the user while the one or both hands are within a sensing area for the sensing element.

In some embodiments, a method includes commencing a session between a user and a computing system; sensing a presence or movement of the user by a sensing element of the apparatus; determining one or more of a position, a movement, and an orientation of the one or both hands of the user; and displaying visual feedback to the user regarding the hand or hands of the user, the visual feedback including a representation of the hand or hands of the user in relation to one or more symbols on a display screen.

FIG. 1 illustrates an embodiment of a computing system including a mechanism to provide visual feedback to users regarding presentation of command gestures. In some embodiments, a computing system 100 includes a display screen to 110 to provide feedback to a user 150 regarding command gestures being performed by the user. In some embodiments, the computing system 100 including one or more sensing elements 120 to sense position and movement of the user 150. Sensing elements may include multiple different elements working together, working in sequence, or both. For example, sensing elements may include elements that provide initial sensing, such as light or sound projection, following by sensing for gesture detection by, for example, an ultrasonic time of flight camera or a patterned light camera.

In particular, the sensing elements 120 may detect movement and position of the hand or hands of the user. In some embodiments, the provide visual feedback regarding gestures of the hand or hands of the computing system, where the visual feedback includes the presentation of images 130 that represent position and movement of the hands of the user in attempted to perform command gestures for operation of the computing system.

Figure 2:
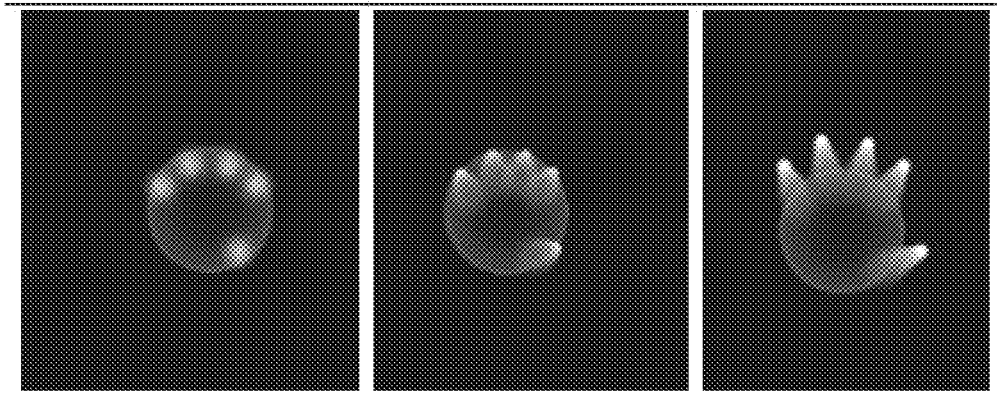
FIG. 2 illustrates as embodiment of a computing system providing visual feedback regarding fingertip presentation.
Figure 2:
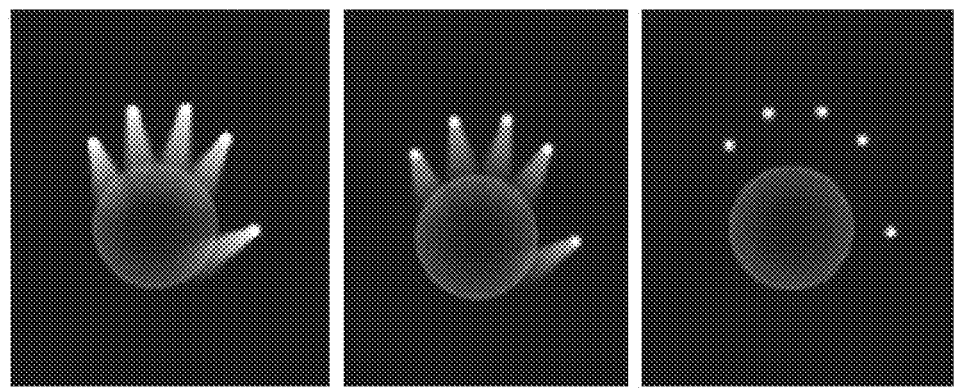

FIG. 2 illustrates as embodiment of a computing system providing visual feedback regarding fingertip presentation. In some embodiments, a computing system, such as system 100 illustrated in FIG. 1, provides visual feedback of the position and movement of the hands of the user by generating images representing the hands, where the images illuminate certain portions of the hands or fingers. In some embodiments, a computing systems provide a light point in a display image to represent the tip of each finger of the hand of the user. In some embodiments, movement of the fingers of the hand of the user results in illustrating a trailing image following the finger-tip-lights.

In some embodiments, a computing system senses the position and movement of the fingers of the user through illustration of the finger-tip-lights shown in 210. In this illustration, the fingers are shown to be close together and do not show any movement, indicating that the user has not recently moved the hands in an attempt to present a command gesture. In some embodiments, the fingers of the user move outward from the first position, with each finger having a trail following the finger to show the relative movement of the fingers 220. In some embodiments, this process continues 230, with the fingers reaching fully extended position 240.

In some embodiments, the computing system 100 operates such that the light trailing the light representing the fingertips of the fingers of the user will begin to fade 250 after a first period of time, and the training light representing the movement of the fingers of the user will eventually fade completely, thus returning the feedback display to showing the lights representing the finger tips of the user in a stationary representation without showing any trailing light 260.

Figure 3:
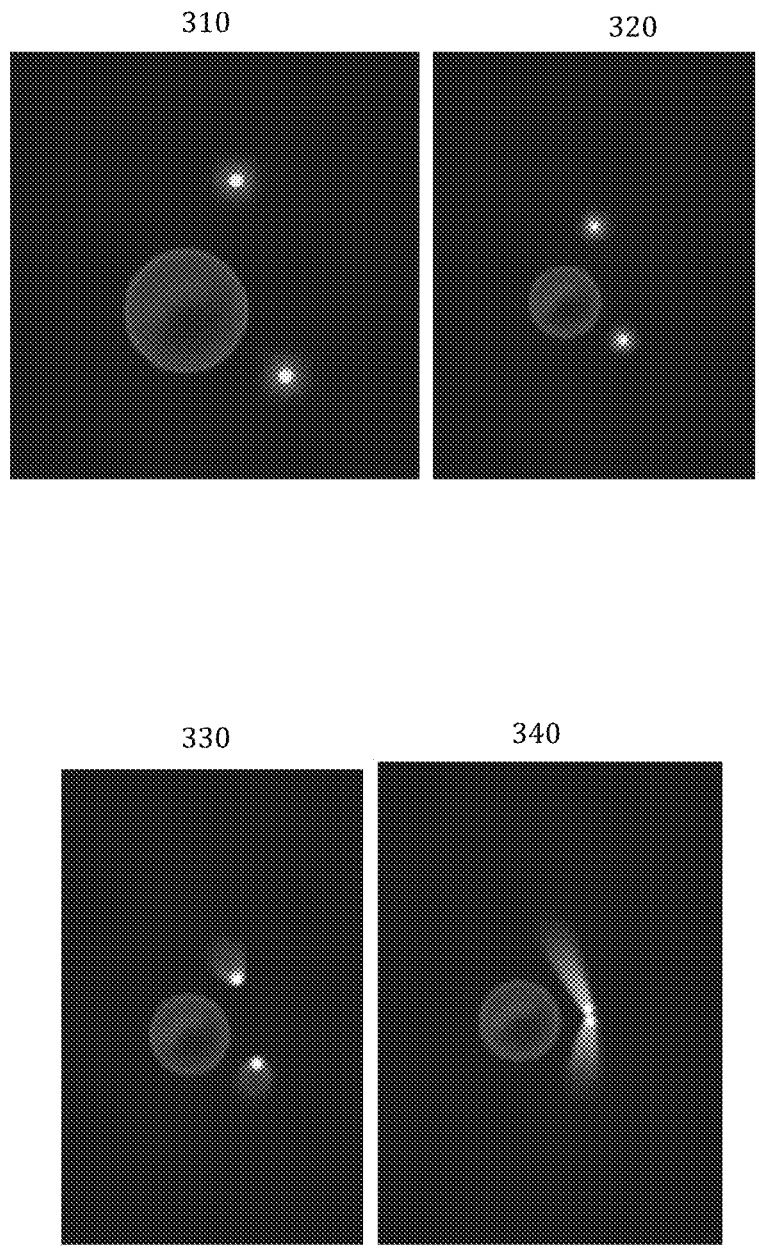
FIG. 3 illustrates as embodiment of a computing system providing feedback regarding a command gesture to zoom out on an element.

FIG. 3 illustrates as embodiment of a computing system providing feedback regarding a command gesture to zoom-out from an element. In some embodiments, a computing system provides two finger-tip-lights to provide feedback regarding a zoom out gesture formed by a hand of the user 310. In some embodiments, the movement of the thumb and other finger or fingers of the hand provide feedback as the thumb and other finger or fingers draw closer, 320 and 330, and show contact when the thumb and other finger or fingers make contact 340.

Figure 4:
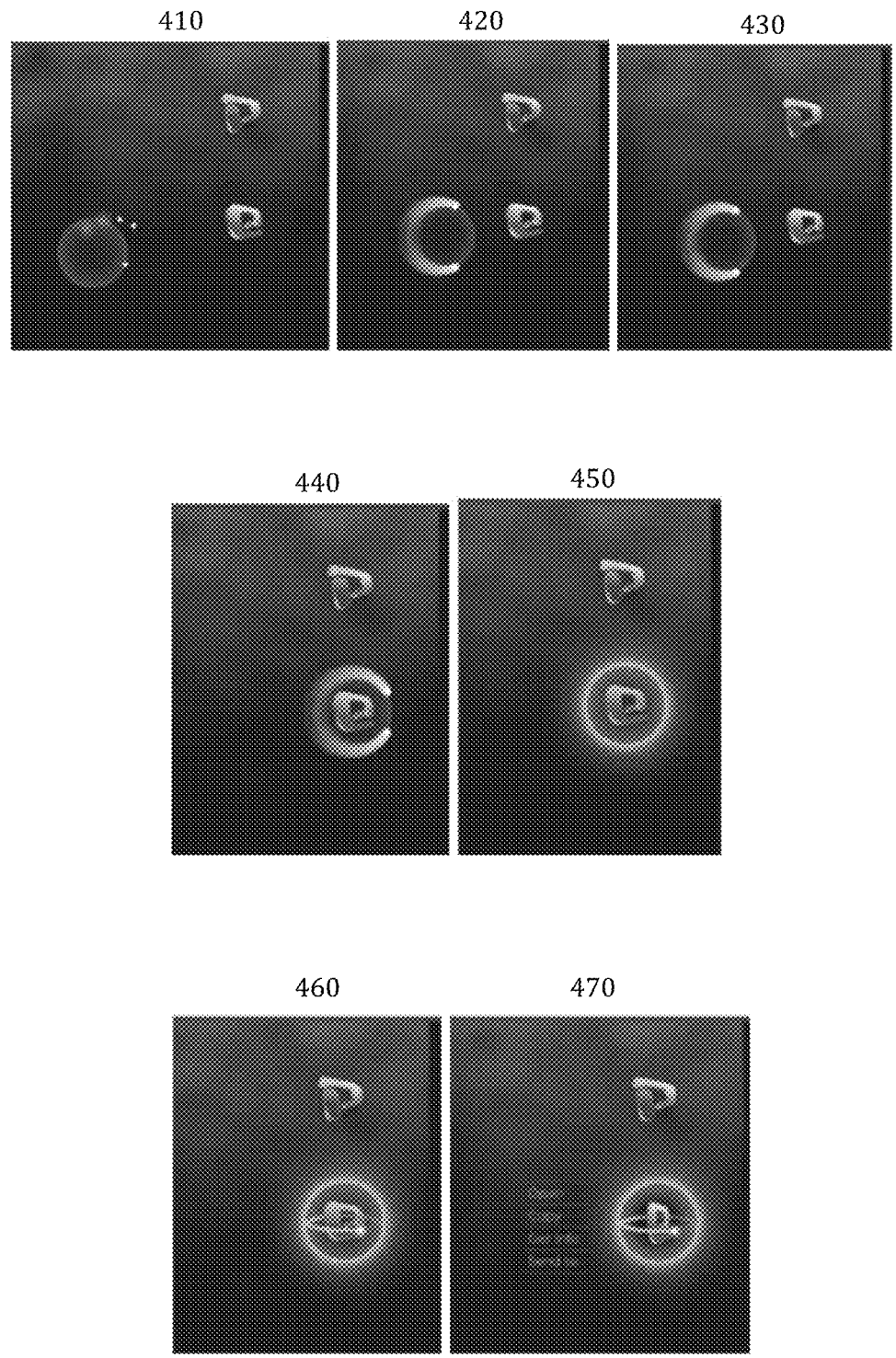
FIG. 4 illustrates as embodiment of a computing system providing feedback regarding a gesture to select an icon or other symbol.

FIG. 4 illustrates as embodiment of a computing system providing feedback regarding a gesture to select an icon or other symbol. In some embodiments, the fingertips of a user's hand 410 may change to a "C" symbol to provide feedback regarding a grasping or claw gesture moving towards an icon 420-430. In some embodiments, the computing system provides feedback as the user's hand in space moves into position to grasp or select an icon 440, and provides a complete circle when the thumb and other finger or fingers of the hand of the user close to select the icon 450. In some embodiments, after selecting an icon, feedback in the form of a rotating light may be provided 460. In some embodiments, feedback in the form of a menu to choose an action in relation to the selected icon is provided 470.

Figure 5:
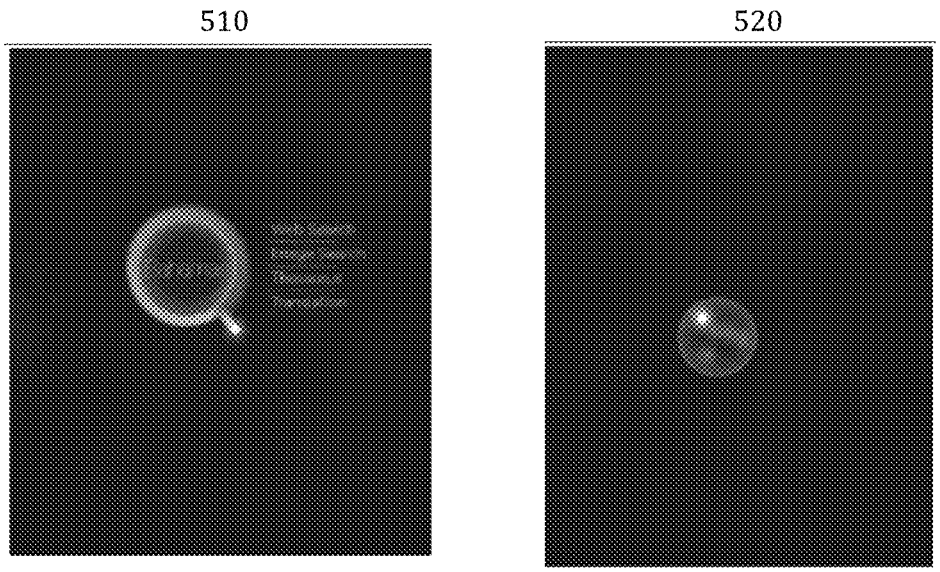
FIG. 5 illustrates as embodiment of a computing system providing feedback regarding an information function.

FIG. 5 illustrates as embodiment of a computing system providing feedback regarding an information function. In some embodiments, a loop gesture performed by the thumb of a user in contact with another finger, analogous to a magnifying glass or similar physical object, provide for further information regarding what is represented by an icon 510. In some embodiments, 520 indicates a "pointing gesture", where once the loop gesture creates options, the second hand may be used to perform a pointing gesture in order to select a particular option.

Figure 6:
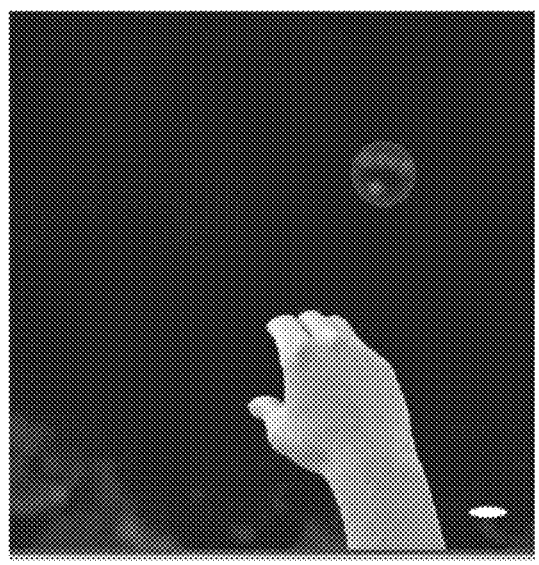
FIG. 6 illustrates as embodiment of a computing system providing feedback regarding user hand orientation.
Figure 6:
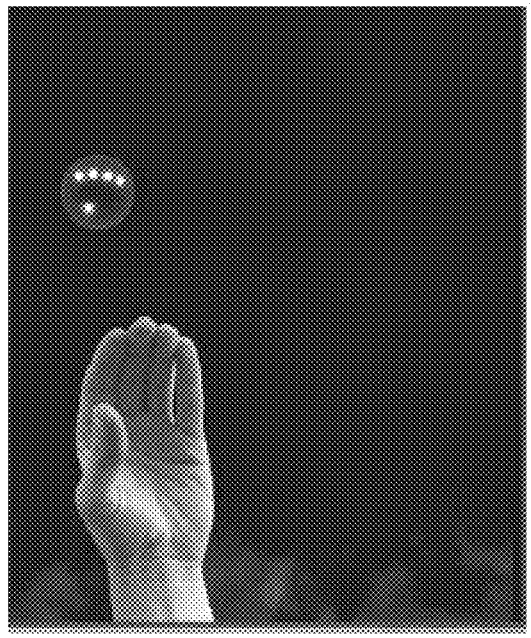

FIG. 6 illustrates as embodiment of a computing system providing feedback regarding user hand orientation. In some embodiments, a computing system provides feedback regarding the orientation of the hands of the user. In this illustration, the feedback indicates that the fingers of a user's hand are oriented towards the display screen by providing a dim representation of the hand 610, and feedback to indicate that the fingers of a user's hand are oriented away from the display screen by providing a brighter representation of the hand 620. However, embodiments are not limited to any particular orientation of the hands. For example, a computing system may provide the opposite feedback regarding the orientation of the hands of the user, where feedback indicates that the fingers of a user's hand are oriented away from the display screen by providing a dim representation of the hand, and feedback indicates that the fingers of a user's hand are oriented towards the display screen by providing a brighter representation of the hands.

Figure 7:
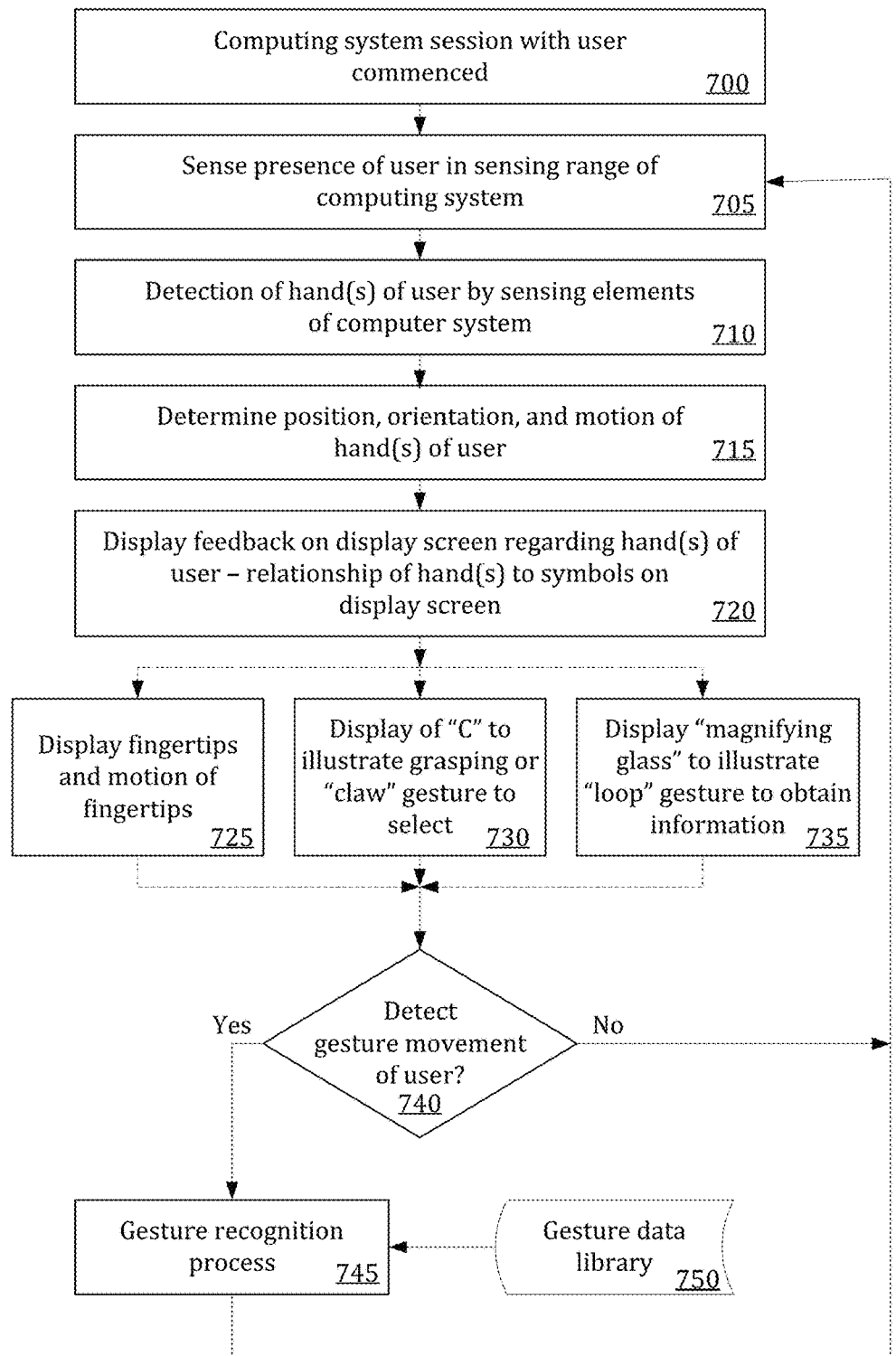
FIG. 7 is a flowchart to illustrate an embodiment of a process for providing visual feedback to a user while performing command gestures.

FIG. 7 is a flowchart to illustrate an embodiment of a process for providing visual feedback to a user while performing command gestures. In some embodiments, a computing system commences a session with a user 700, and the presence of the user is sensed in a sensing area of the computing system 705. In some embodiments, one or both hands of the user are detected by the computing system 710, and the system detects the position, orientation, and motion of the hand or hands of the user 715.

In some embodiments, the computing system provides visual feedback regarding the hand or hands of the user, where the display provides feedback regarding the relationship between the hand or hands of the user and the symbols on the display screen 720. In some embodiments, the feedback includes one or more of visual feedback of the fingertips of the hand or hands of the user (such as finger-tip-lights) and the motion of the fingertips (such as a light trail following a fingertip) 725; visual feedback of a "C" shape to show a grasping or "claw" gesture to select icons 730; and visual feedback of a magnifying glass or loop to illustrate a loop gesture to obtain information regarding what is represented by an icon 735.

In some embodiments, if gesture movement of the user is detected 740 the computing system provides a gesture recognition process 745, which may include use of data from a gesture data library that is accessible to the computing system, 750.

Figure 8:
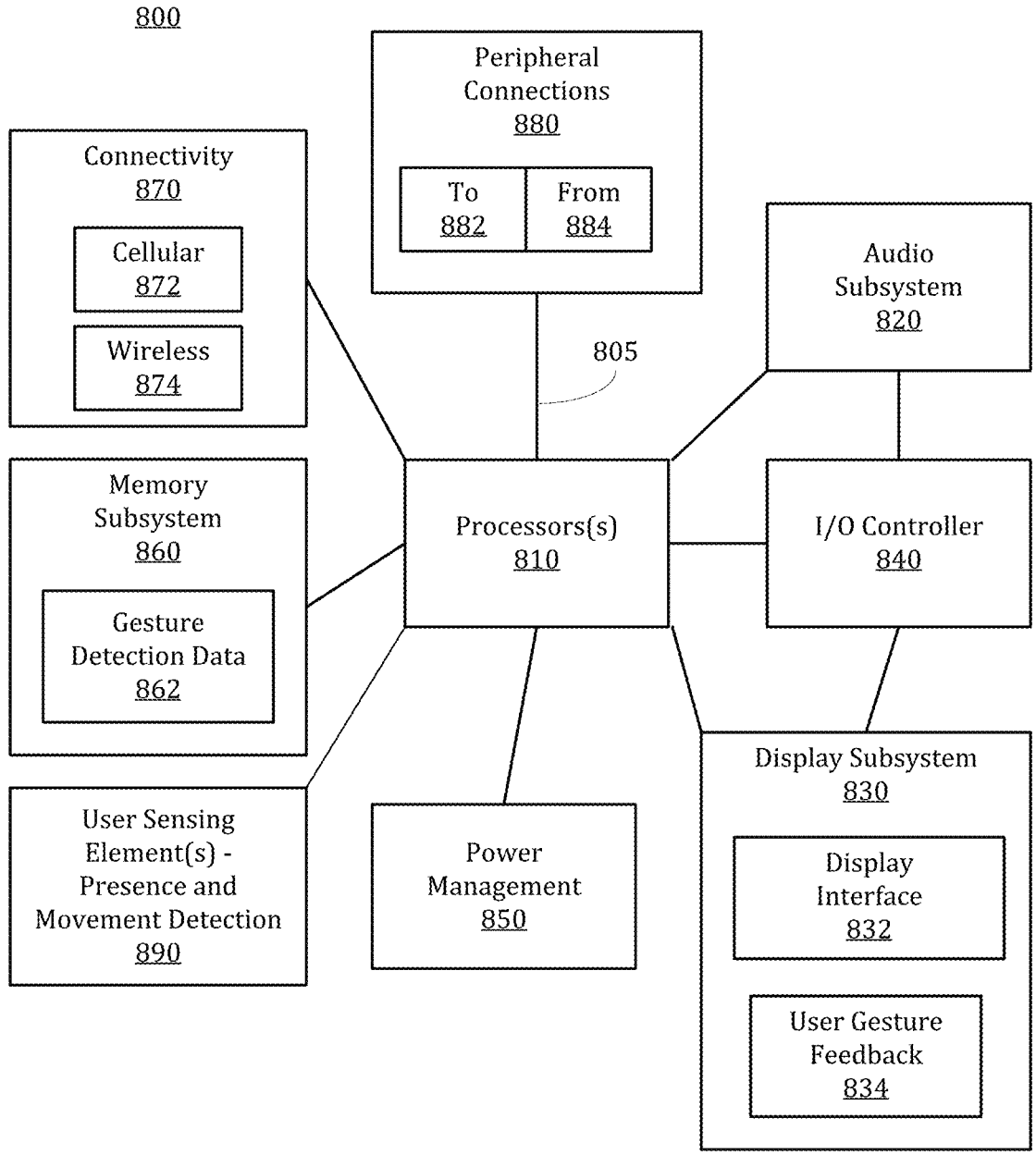
FIG. 8 is a block diagram to illustrate an embodiment a computing system including a mechanism to provide feedback to users regarding presentation of command gestures.

FIG. 8 is a block diagram to illustrate an embodiment a computing system including a mechanism to provide feedback to users regarding presentation of command gestures. Computing system 800 represents any computing device or system utilizing user sensing, including a mobile computing device, such as a laptop computer, computing tablet, a mobile phone or smartphone, a wireless-enabled e-reader, or other wireless mobile device. It will be understood that certain of the components are shown generally, and not all components of such a computing system are shown in computing system 800. The components may be connected by one or more buses or other connections 805.

Computing system 800 includes processor 810, which performs the primary processing operations of computing system 800. Processor 810 can include one or more physical devices, such as microprocessors, application processors, microcontrollers, programmable logic devices, or other processing means. The processing operations performed by processor 810 include the execution of an operating platform or operating system on which applications, device functions, or both are executed. The processing operations include, for example, operations related to I/O (input/output) with a human user or with other devices, operations related to power management, and operations related to connecting computing system 800 to another system or device. The processing operations may also include operations related to audio I/O, display I/O, or both. Processors 810 may include one or more graphics processing units (GPUs), including a GPU used for general-purpose computing on graphics processing units (GPGPU).

In some embodiments, computing system 800 includes audio subsystem 820, which represents hardware (such as audio hardware and audio circuits) and software (such as drivers and codecs) components associated with providing audio functions to the computing system. Audio functions can include speaker output, headphone output, or both, as well as microphone input. Devices for such functions can be integrated into computing system 800, or connected to computing system 800. In some embodiments, a user interacts with computing system 800 by providing audio commands that are received and processed by processor 810.

Display subsystem 830 represents hardware (for example, display devices) and software (for example, drivers) components that provide a visual display, a tactile display, or combination of displays for a user to interact with the computing system 800. Display subsystem 830 includes display interface 832, which includes the particular screen or hardware device used to provide a display to a user. In one embodiment, display interface 832 includes logic separate from processor 810 to perform at least some processing related to the display. In one embodiment, display subsystem 830 includes a touchscreen device that provides both output and input to a user.

In some embodiments, the display subsystem 830 of the computing system 800 includes user gesture feedback 834 to provide visual feedback to the user regarding the relationship between the gestures performed by the user and the elements of the display. In some embodiments, the feedback includes one or more of visual feedback of the fingertips of the hand or hands of the user (such as finger-tip-lights) and the motion of the fingertips (such as a light trail following a fingertip); visual feedback of a "C" shape to show a grasping or "claw" gesture to select icons; and visual feedback of a magnifying glass or loop to illustrate a loop gesture to obtain information regarding what is represented by an icon.

I/O controller 840 represents hardware devices and software components related to interaction with a user. I/O controller 840 can operate to manage hardware that is part of audio subsystem 820 and hardware that is part of the display subsystem 830. Additionally, I/O controller 840 illustrates a connection point for additional devices that connect to computing system 800 through which a user might interact with the system. For example, devices that can be attached to computing system 800 might include microphone devices, speaker or stereo systems, video systems or other display device, keyboard or keypad devices, or other I/O devices for use with specific applications such as card readers or other devices.

As mentioned above, I/O controller 840 can interact with audio subsystem 820, display subsystem 830, or both. For example, input through a microphone or other audio device can provide input or commands for one or more applications or functions of computing system 800. Additionally, audio output can be provided instead of or in addition to display output. In another example, if display subsystem includes a touchscreen, the display device also acts as an input device, which can be at least partially managed by I/O controller 840. There can also be additional buttons or switches on computing system 800 to provide I/O functions managed by I/O controller 840.

In one embodiment, I/O controller 840 manages devices such as accelerometers, cameras, light sensors or other environmental sensors, or other hardware that can be included in computing system 800. The input can be part of direct user interaction, as well as providing environmental input to the system to influence its operations (such as filtering for noise, adjusting displays for brightness detection, applying a flash for a camera, or other features).

In one embodiment, computing system 800 includes power management 850 that manages battery power usage, charging of the battery, and features related to power saving operation. Memory subsystem 860 includes memory devices for storing information in computing system 800. Memory can include nonvolatile (state does not change if power to the memory device is interrupted) memory devices and volatile (state is indeterminate if power to the memory device is interrupted) memory devices. Memory 860 can store application data, user data, music, photos, documents, or other data, as well as system data (whether long-term or temporary) related to the execution of the applications and functions of system 800. In particular, memory may include gesture detection data 862 for use in detecting and interpreting gestures by a user of the computing system 800.

In some embodiments, computing system 800 includes one or more user sensing elements 890 to sense presence and motion, wherein may include one or more cameras or other visual sensing elements, one or more microphones or other audio sensing elements, one or more infrared or other heat sensing elements, or any other element for sensing the presence or movement of a user.

Connectivity 870 includes hardware devices (such as wireless and wired connectors and communication hardware) and software components (such as drivers and protocol stacks) to enable computing system 800 to communicate with external devices. The computing system could include separate devices, such as other computing devices, wireless access points or base stations, as well as peripherals such as headsets, printers, or other devices.

Connectivity 870 can include multiple different types of connectivity. To generalize, computing system 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 874 refers to wireless connectivity that is not cellular, and can include personal area networks (such as Bluetooth), local area networks (such as WiFi), wide area networks (such as WiMax), or other wireless communication. Connectivity 870 may include an omnidirectional or directional antenna for transmission of data, reception of data, or both.

Peripheral connections 880 include hardware interfaces and connectors, as well as software components (for example, drivers and protocol stacks) to make peripheral connections. It will be understood that computing system 800 could both be a peripheral device ("to" 882) to other computing devices, as well as have peripheral devices ("from" 884) connected to it. Computing system 800 commonly has a "docking" connector to connect to other computing devices for purposes such as managing (such as downloading, uploading, changing, and synchronizing) content on computing system 800. Additionally, a docking connector can allow computing system 800 to connect to certain peripherals that allow computing system 800 to control content output, for example, to audiovisual or other systems.

In addition to a proprietary docking connector or other proprietary connection hardware, computing system 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Figure 9:
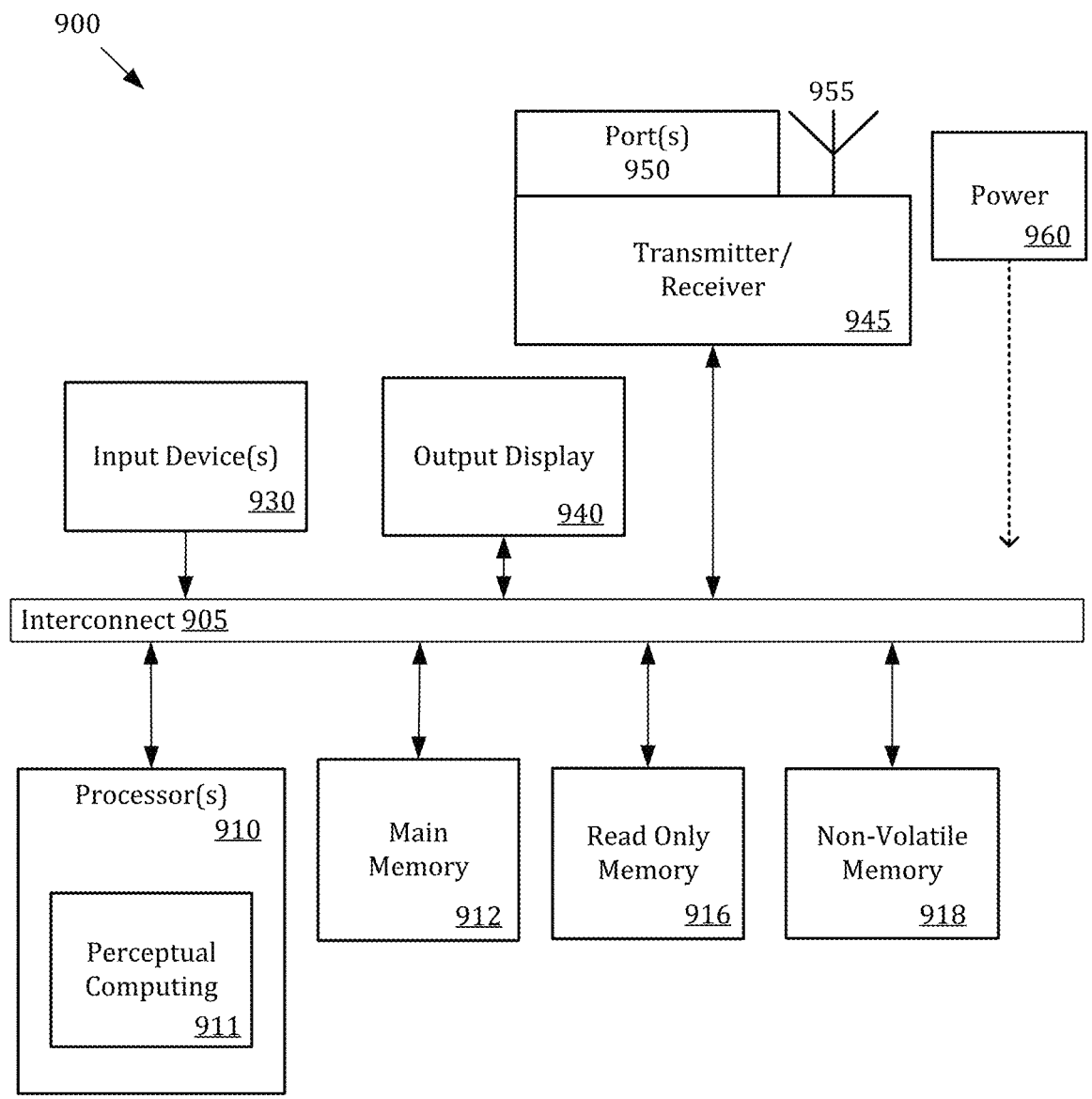
FIG. 9 illustrates an embodiment of a computing system for perceptual computing.

FIG. 9 illustrates an embodiment of a computing system for perceptual computing. The computing system may include a computer, server, game console, or other computing apparatus. In this illustration, certain standard and well-known components that are not germane to the present description are not shown. Under some embodiments, the computing system 900 comprises an interconnect or crossbar 905 or other communication means for transmission of data. The computing system 900 may include a processing means such as one or more processors 910 coupled with the interconnect 905 for processing information. The processors 910 may comprise one or more physical processors and one or more logical processors. The interconnect 905 is illustrated as a single interconnect for simplicity, but may represent multiple different interconnects or buses and the component connections to such interconnects may vary. The interconnect 905 shown in FIG. 9 is an abstraction that represents any one or more separate physical buses, point-to-point connections, or both connected by appropriate bridges, adapters, or controllers.

Processing by the one or more processors include processing for perceptual computing 911, where such processing includes sensing and interpretation of gestures in relation to a virtual boundary of the computing system.

In some embodiments, the computing system 900 further comprises a random access memory (RAM) or other dynamic storage device or element as a main memory 912 for storing information and instructions to be executed by the processors 910. RAM memory includes dynamic random access memory (DRAM), which requires refreshing of memory contents, and static random access memory (SRAM), which does not require refreshing contents, but at increased cost. In some embodiments, main memory may include active storage of applications including a browser application for using in network browsing activities by a user of the computing system. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory.

The computing system 900 also may comprise a read only memory (ROM) 916 or other static storage device for storing static information and instructions for the processors 910. The computing system 900 may include one or more non-volatile memory elements 918 for the storage of certain elements.

In some embodiments, the computing system 900 includes one or more input devices 930, where the input devices include one or more of a keyboard, mouse, touch pad, voice command recognition, gesture recognition, or other device for providing an input to a computing system.

The computing system 900 may also be coupled via the interconnect 905 to an output display 940. In some embodiments, the display 940 may include a liquid crystal display (LCD) or any other display technology, for displaying information or content to a user. In some environments, the display 940 may include a touch-screen that is also utilized as at least a part of an input device. In some environments, the display 940 may be or may include an audio device, such as a speaker for providing audio information.

One or more transmitters or receivers 945 may also be coupled to the interconnect 905. In some embodiments, the computing system 900 may include one or more ports 950 for the reception or transmission of data. The computing system 900 may further include one or more omnidirectional or directional antennas 955 for the reception of data via radio signals.

The computing system 900 may also comprise a power device or system 960, which may comprise a power supply, a battery, a solar cell, a fuel cell, or other system or device for providing or generating power. The power provided by the power device or system 960 may be distributed as required to elements of the computing system 900.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. At least one optical memory, semiconductor memory, random access memory (RAM), erasable programmable read-only memory (EPROM), electrically-erasable programmable read-only memory (EEPROM), Flash Memory, or magnetic memory comprising instructions that, when executed, cause at least one processor to at least:
   access first data, the first data based on one or more outputs of one or more sensors of a plurality of sensors in response to a first movement of a first finger of a hand of a user relative to a second finger of the hand to indicate a first interaction with content on a display screen;
   determine a first orientation of the first finger relative to the content based on the first data;
   cause display of a first visual representation of the first finger on the display screen to illustrate the first interaction with the content based on the first orientation of the first finger, the first visual representation having a shape of a human hand including the first finger, the second finger, and a portion of the hand that is not part of a finger;
   access second data, the second data based on one or more outputs of the one or more sensors of the plurality of sensors in response to a second movement of the first finger of the hand of the user relative to the second finger of the hand to indicate a second interaction with the content, the second movement different than the first movement;
   determine a second orientation of the first finger relative to the content based on the second data, the second orientation corresponding to a change in orientation of the first finger relative to the first orientation; and
   cause display of a second visual representation of the first finger on the display screen to illustrate the second interaction with the content based on the second orientation of the first finger, the second visual representation having the shape of the human hand including the first finger, the second finger, and the portion of the hand that is not part of a finger, at least a portion of the second visual representation corresponding to the first finger to be illuminated relative to a corresponding portion of the first visual representation of the first finger in response to the change in orientation of the first finger corresponding to the second interaction.

2. The at least one optical memory, semiconductor memory, random access memory (RAM), erasable programmable read-only memory (EPROM), electrically-erasable programmable read-only memory (EEPROM), Flash Memory, or magnetic memory as defined in claim 1, wherein the first interaction corresponds to a grasp gesture of the first finger relative to the content.

3. The at least one optical memory, semiconductor memory, random access memory (RAM), erasable programmable read-only memory (EPROM), electrically-erasable programmable read-only memory (EEPROM), Flash Memory, or magnetic memory as defined in claim 2, wherein the first visual representation is to depict the first finger and the second finger in the grasp gesture.

4. The at least one optical memory, semiconductor memory, random access memory (RAM), erasable programmable read-only memory (EPROM), electrically-erasable programmable read-only memory (EEPROM), Flash Memory, or magnetic memory as defined in claim 1, wherein the instructions when executed, further cause display of a third visual representation of a finger of a second hand of the user on the display screen with the first visual representation.

5. The at least one optical memory, semiconductor memory, random access memory (RAM), erasable programmable read-only memory (EPROM), electrically-erasable programmable read-only memory (EEPROM), Flash Memory, or magnetic memory as defined in claim 1, wherein the first interaction corresponds to a point gesture of the first finger relative to the content.

6. The at least one optical memory, semiconductor memory, random access memory (RAM), erasable programmable read-only memory (EPROM), electrically-erasable programmable read-only memory (EEPROM), Flash Memory, or magnetic memory as defined in claim 1, wherein the first visual representation is to depict the first finger in contact with the second finger.

7. The at least one optical memory, semiconductor memory, random access memory (RAM), erasable programmable read-only memory (EPROM), electrically-erasable programmable read-only memory (EEPROM), Flash Memory, or magnetic memory as defined in claim 1, wherein the first data includes light tracking data.

8. The at least one optical memory, semiconductor memory, random access memory (RAM), erasable programmable read-only memory (EPROM), electrically-erasable programmable read-only memory (EEPROM), Rash Memory, or magnetic memory as defined in claim 1, wherein the portion of the hand includes a back of the hand or a palm of the hand.

9. A system comprising:
   memory;
   instructions in the system; and
   at least one processor to execute the instructions to:
      access first data, the first data based on one or more outputs of one or more sensors of a plurality of sensors in response to a first movement of a first finger of a hand of a user relative to a second finger of the hand to indicate a first interaction with content on a display screen;

determine a first orientation of the first finger relative to the content based on the first data;

cause display of a first visual representation on the display screen to illustrate the first interaction with the content based on the first orientation of the first finger, the first visual representation having a shape of a human hand including the first finger, the second finger, and a portion of the hand between the first finger and a wrist;

access second data, the second data based on one or more outputs of the one or more sensors of the plurality of sensors in response to a second movement of the first finger of the hand of the user relative to the second finger of the hand to indicate a second interaction with the content, the second movement different than the first movement;

determine a second orientation of the first finger relative to the content based on the second data, the second orientation corresponding to a change in orientation of the first finger relative to the first orientation; and cause display of a second visual representation on the display screen to illustrate the second interaction with the content based on the second orientation of the first finger, the second visual representation having the shape of the human hand including the first finger, the second finger, and the portion of the hand between the first finger and the wrist, at least a portion of the second visual representation of the first finger to be illuminated relative to a corresponding portion of the first visual representation corresponding to the first finger in response to the change in orientation of the first finger corresponding to the second interaction.

10. The system as defined in claim 9, wherein the first interaction corresponds to a grasp gesture of the first finger relative to the content.

11. The system as defined in claim 10, wherein the first visual representation is to depict the first finger and the second finger in the grasp gesture.

12. The system as defined in claim 9, wherein the at least one processor is to cause display of a third visual representation of a finger of a second hand of the user on the display screen with the first visual representation.

13. The system as defined in claim 9, wherein the first interaction corresponds to a point gesture of the first finger relative to the content.

14. The system as defined in claim 9, wherein the first visual representation is to depict the first finger in contact with the second finger.

15. The system as defined in claim 9, wherein the first data includes light tracking data.

16. The system as defined in claim 9, wherein the portion of the hand includes a back of the hand or a palm of the hand.

17. A system comprising:
means for sensing;
means for displaying;
means for processing to:
access first data, the first data based on one or more outputs of the sensing means in response to a first movement of a first finger of a hand of a user relative to a second finger of the hand to indicate a first interaction with content on the display means;

determine a first orientation of the first finger relative to the content based on the first data;

access second data, the second data based on one or more outputs of the sensing means in response to a second movement of the first finger of the hand of the user relative to the second finger of the hand to indicate a second interaction with the content, the second movement different than the first movement;

determine a second orientation of the first finger relative to the content based on the second data, the second orientation corresponding to a change in orientation of the first finger relative to the first orientation;

cause display of a first visual representation of the first finger on the display means to illustrate the first interaction with the content based on the first orientation of the first finger, the first visual representation having a shape of a human hand including the first finger, at least one of the second finger or one or more other fingers of the hand, and at least a portion of the hand between a wrist and the fingers; and cause display of a second visual representation of the first finger on the display means to illustrate the second interaction with the content based on the second orientation of the first finger, the second visual representation having the shape of the human hand including the first finger, the at least one of the second finger or the one or more of the other fingers of the hand, and the at least the portion of the hand between the wrist and the fingers, the first finger of the second visual representation to be illuminated relative to a corresponding portion of the first visual representation of the first finger in response to the change in orientation of the first finger corresponding to the second interaction.

18. The system as defined in claim 17, wherein the first interaction corresponds to a grasp gesture of the first finger relative to the content.

19. The system as defined in claim 18, wherein the first visual representation is to depict the first finger and the second finger in the grasp gesture.

20. The system as defined in claim 17, wherein the processing means is to cause display of a third visual representation of a finger of a second hand of the user on the display means with the first visual representation.

21. The system as defined in claim 17, wherein the first interaction corresponds to a point gesture of the first finger relative to the content.

22. The system as defined in claim 17, wherein the first visual representation is to depict the first finger in contact with the second finger.

23. The system as defined in claim 17, wherein the first data includes light tracking data.

24. The system as defined in claim 17, wherein the portion of the hand includes a back of the hand or a palm of the hand.

25. A method comprising:
accessing first data, the first data based on one or more outputs of one or more sensors of a plurality of sensors in response to a first movement of a first finger of a hand of a user relative to a second finger of the hand to indicate a first interaction with content on a display screen;

determining, by executing an instruction with at least one processor, a first orientation of the first finger relative to the content based on the first data;

causing, by executing an instruction with the at least one processor, display of a first visual representation of the first finger on the display screen to illustrate the first interaction with the content based on the first orientation of the first finger, the first visual representation having a shape of a human hand including the first finger, the second finger, and a portion of the hand that is not part of a finger;

accessing second data, the second data based on one or more outputs of the one or more sensors of the plurality of sensors in response to a second movement of the first finger of the hand of the user relative to the second finger of the hand to indicate a second interaction with the content, the second movement different than the first movement;

determining, by executing an instruction with the at least one processor, a second orientation of the first finger relative to the content based on the second data, the second orientation corresponding to a change in orientation of the first finger relative to the first orientation; and causing, by executing an instruction with the least one processor, display of a second visual representation of the first finger on the display screen to illustrate the second interaction with the content based on the second orientation of the first finger, the second visual representation having the shape of the human hand including the first finger, the second finger, and the portion of the hand that is not part of a finger, at least a portion of the second visual representation corresponding to the first finger to be illuminated relative to a corresponding portion of the first visual representation of the first finger in response to the change in orientation of the first finger corresponding to the second interaction.

26. The method as defined in claim 25, wherein the first interaction corresponds to a grasp gesture of the first finger relative to the content.

27. The method as defined in claim 26, wherein the first visual representation is to depict the first finger and the second finger in the grasp gesture.

28. The method as defined in claim 25, further including causing display of a third visual representation of a finger of a second hand of the user on the display screen with the first visual representation.

29. The method as defined in claim 25, wherein the first interaction corresponds to a point gesture of the first finger relative to the content.

30. The method as defined in claim 25, wherein the first visual representation is to depict the first finger in contact with the second finger.

31. The method as defined in claim 25, wherein the first data includes light tracking data.

32. The method as defined in claim 25, wherein the portion of the hand includes a back of the hand or a palm of the hand.

* * * * *